US009259963B2

(12) United States Patent
Uemura et al.

(10) Patent No.: US 9,259,963 B2
(45) Date of Patent: Feb. 16, 2016

(54) METHOD FOR COATING ALUMINUM WHEEL, AND ALUMINUM WHEEL

(75) Inventors: Junya Uemura, Osaka (JP); Toru Shimizu, Tokyo (JP); Koji Murakami, Tokyo (JP); Tatsuya Oguri, Tokyo (JP); Masafumi Maeda, Tokyo (JP)

(73) Assignees: Nippon Paint Co., Ltd., Osaka (JP); Topy Industries Ltd., Tokyo (JP)

( * ) Notice: Subject to any disclaimer, the term of this patent is extended or adjusted under 35 U.S.C. 154(b) by 163 days.

(21) Appl. No.: 13/979,205

(22) PCT Filed: Jan. 12, 2012

(86) PCT No.: PCT/JP2012/050436
§ 371 (c)(1),
(2), (4) Date: Aug. 15, 2013

(87) PCT Pub. No.: WO2012/096331
PCT Pub. Date: Jul. 19, 2012

(65) Prior Publication Data
US 2013/0313888 A1 Nov. 28, 2013

(30) Foreign Application Priority Data

Jan. 12, 2011 (JP) ................................. 2011-003748

(51) Int. Cl.
| | |
|---|---|
| B05D 7/16 | (2006.01) |
| C09D 163/04 | (2006.01) |
| B60B 19/00 | (2006.01) |
| B05D 7/00 | (2006.01) |
| B60B 23/04 | (2006.01) |
| B60B 23/10 | (2006.01) |
| B60B 25/20 | (2006.01) |
| C09D 163/00 | (2006.01) |
| C09D 5/08 | (2006.01) |
| C08K 3/36 | (2006.01) |
| C09D 133/08 | (2006.01) |
| C23C 22/36 | (2006.01) |
| B05D 7/14 | (2006.01) |
| B82Y 30/00 | (2011.01) |

(52) U.S. Cl.
CPC . *B60B 19/00* (2013.01); *B05D 7/16* (2013.01); *B05D 7/53* (2013.01); *B60B 23/04* (2013.01); *B60B 23/10* (2013.01); *B60B 25/20* (2013.01); *C08K 3/36* (2013.01); *C09D 5/08* (2013.01); *C09D 133/08* (2013.01); *C09D 163/00* (2013.01); *C09D 163/04* (2013.01); *C23C 22/361* (2013.01); *B05D 7/14* (2013.01); *B05D 2202/25* (2013.01); *B05D 2502/00* (2013.01); *B05D 2504/00* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 6,153,264 | A | 11/2000 | Schmid et al. |
| 2009/0087667 | A1* | 4/2009 | Tomizaki et al. ............. 428/413 |

FOREIGN PATENT DOCUMENTS

| | | |
|---|---|---|
| CN | 1218491 A | 6/1999 |
| CN | 101560358 A | 10/2009 |
| JP | H06-57177 A | 3/1994 |
| JP | H06-57178 A | 3/1994 |
| JP | 2002-239455 A | 8/2002 |
| JP | 2002-241674 A | 8/2002 |
| JP | 2009-256634 A | 11/2009 |

* cited by examiner

*Primary Examiner* — Shamim Ahmed
*Assistant Examiner* — Bradford Gates
(74) *Attorney, Agent, or Firm* — Novak Druce Connolly Bove + Quigg LLP

(57) ABSTRACT

The present invention provides a method for coating an aluminum wheel using a coating composition capable of forming a coating film having a superior cosmetic property as well as an anticorrosive property much enough for preventing corrosion even in the use in an area where the coating film is susceptible to salt damage, and an aluminum wheel obtained by the method. A method for coating an aluminum wheel including applying an anticorrosive coating composition onto the aluminum wheel, and thereafter applying a clear coating composition to form a transparent multilayer coating film, wherein the anticorrosive coating composition contains an acrylic resin (1) having a weight average molecular weight of 50,000 to 140,000, a glass transition point of 20 to 50° C., a hydroxyl value of 10 to 50 mgKOH/g, and an acid value of 10 to 40 mgKOH/g, and an epoxy resin (2) having an epoxy equivalent of 210 to 1,000 g/eq and contains the epoxy resin (2) in an amount of 5 to 20 parts by weight on the solid matter basis to 100 parts by weight of the solid matter of the acrylic resin (1).

4 Claims, No Drawings

METHOD FOR COATING ALUMINUM WHEEL, AND ALUMINUM WHEEL

CROSS REFERENCE TO RELATED APPLICATIONS

This application is a National Phase filing under 35 U.S.C. §371 of PCT/JP2010/050436 filed on Jan. 12, 2012; and this application claims priority to Application No. 2011-003748 filed in Japan on Jan. 12, 2011 under 35 U.S.C. §119; the entire contents of all are hereby incorporated by reference.

The present invention relates to a method for coating an aluminum wheel, and an aluminum wheel obtained by the coating method.

BACKGROUND OF THE DISCLOSURE

Generally, aluminum wheels have been obtained by conducting a shot step of shooting a chip of metal such as a stainless alloy onto an aluminum alloy molded by means of casting, forging or the like, and then cutting intended parts.

An aluminum wheel having been subjected to such processing is further subjected to chemical conversion treatment and then coating for imparting an anticorrosive property, a cosmetic property, and weatherability is applied to the whole area or a part of the surface thereof. Since aluminum wheels are required to have a cosmetic property at a high level and an anticorrosive property under severe usage conditions, studies about such coating to obtain superior appearance and a high anticorrosive performance have been performed.

Especially in bay areas where contact with the salt of sea water is prone to occur or in cold areas where a large amount of calcium chloride as an antifreezing agent is used, a coating film is susceptible to degradation due to salt damage, and therefore there is a problem that the appearance easily deteriorates or rust is likely to be formed due to the corrosion of the aluminum alloy. What is needed therefore is a method for forming a coating film having an anticorrosive performance at a higher level enough for coping with such problems.

Especially in recent years, chemical conversion treatment with a zirconium compound as a nonchromate treatment has been conducted from the standpoint of environmental load without conducting a chromate treatment conventionally employed in chemical conversion treatment. However, the nonchromate chemical conversion treatment with a zirconium compound may be inferior to chromate treatment in anticorrosive property and therefore anticorrosive property has been secured by a multilayer coating film including a nonchromate chemical conversion treatment film, an anticorrosive coating film, and a clear coating film.

Patent Document 1 discloses an anticorrosive coating composition containing an acrylic resin having specific physical properties, an epoxy resin, powdery silica, and crosslinked polymer particles. Moreover, there is also disclosed a thick coating composition containing an acrylic resin, a blocked isocyanate compound, powdery silica, and crosslinked polymer particles. Furthermore, there is also disclosed a method for forming a coating film using the anticorrosive coating composition and a thick coating composition.

Patent Document 2 discloses a rust preventive primer coating composition containing an acrylic resin, an epoxy resin, a blocked polyisocyanate compound, organic bentonite, and an amide-based wetting dispersant.

Patent Document 3 discloses a method for forming a coating film using a rust preventive primer coating composition containing an acrylic resin, an epoxy resin, a blocked polyisocyanate compound, organic bentonite, and an amide-based wetting dispersant. However, the degradation of a coating film due to salt damage has failed to be completely controlled by methods for forming a coating film using any of the coating compositions of the patent documents, and none of the coating compositions has exhibited satisfactory anticorrosive properties under severe usage conditions in the form of a multilayer coating film in the case of nonchromate chemical conversion treatment.

PRIOR TECHNICAL DOCUMENTS

Patent Documents

[Patent Document 1] Japanese Kokai Publication Hei 06-57178

[Patent Document 2] Japanese Kokai Publication 2002-241674

[Patent Document 3] Japanese Kokai Publication 2002-239455

SUMMARY OF INVENTION

Problem to be Solved by the Invention

In light of such current situations, the present invention provides a method for coating an aluminum wheel using a coating composition capable of forming a coating film having a superior cosmetic property as well as an anticorrosive property and adhesion much enough for preventing corrosion even in the use in an area where the coating film is susceptible to salt damage, and an aluminum wheel obtained by the method.

Means for Solving the Problem

The present invention is a method for coating an aluminum wheel including forming a transparent multilayer coating film by applying an anticorrosive coating composition onto the aluminum wheel and then applying a clear coating composition, wherein the anticorrosive coating composition contains an acrylic resin (1) having a weight average molecular weight of 50,000 to 140,000, a glass transition point of 20 to 50° C., a hydroxyl value of 10 to 50 mgKOH/g, and an acid value of 10 to 40 mgKOH/g, and an epoxy resin (2) having an epoxy equivalent of 210 to 1,000 g/eq and contains the epoxy resin (2) in an amount of 5 to 20 parts by weight on the solid matter basis to 100 parts by weight of the solid matter of the acrylic resin (1).

It is preferable that the anticorrosive coating composition further contains, for 100 parts by weight of the solid matter in total of the components (1) and (2), 5 to 20 parts by weight of powdery silica (3) having a number average diameter of primary particles of 7 to 9 nm and a specific surface area (BET method) of 200 to 380 m$^2$/g, and 1 to 10 parts by weight of crosslinked polymer particles (4) having a number average diameter of primary particles of 50 to 80 nm.

The clear coating composition may contain an acrylic resin (5) and a melamine resin (6), and further contain, for 100 parts by weight of the solid matter of the components (5) and (6) in total, 1 to 5 parts by weight of an ultraviolet absorber (7) and 1 to 5 parts by weight of a light stabilizer (8).

The present invention is also an aluminum wheel coated by any one of the methods described above.

Effect of the Invention

By the use of the coating method of the present invention there can be produced an aluminum wheel having a superior cosmetic property and an anticorrosive property that allows less degradation from salt damage to occur.

DETAILED DESCRIPTION OF PREFERRED EMBODIMENTS

The present invention is a method for coating an aluminum wheel, the method including forming a transparent multilayer coating film by applying an anticorrosive coating composition and then applying a clear coating composition.

In the present invention, a coating film being good in adhesion between a substrate and a clear coating film layer is formed by the use of a coating composition containing an epoxy resin as an anticorrosive coating composition. Conventional coating compositions have afforded coating films which are soft due to the low glass transition points of the resins to be used and therefore the coating films have suffered from great blistering, resulting in a poor corrosion resistance. For this reason, the present invention has improved the corrosion resistance by using an acrylic resin being high in glass transition point as an anticorrosive coating composition and reducing the blistering of a coating composition through the improvement in a shielding property of an anticorrosive factor by increasing the crosslinking density of the coating film. Moreover, the adhesion with a substrate has been improved by the addition of an epoxy resin. Furthermore, the coating composition viscosity is increased to secure an edge covering property by the incorporation of powdery silica and crosslinked polymer particles having specific numeric property values, and the combination thereof affords a superior anticorrosive performance. In addition, the present invention exhibits a superior performance also with a wheel coating composition requiring appearance (smoothness), chipping resistance, and weatherability.

For an aluminum wheel which is the article to be coated of the present invention, for example, an aluminum alloy substrate such as an AC4C alloy, which is classified as an Al—Si—Mg alloy or an AC4CH alloy is mainly used.

Generally, an aluminum wheel is produced by shaping an aluminum alloy into a wheel form by means of casting, forging or the like. Then, a chip of metal such as a stainless alloy is shot onto the molded aluminum alloy for the purpose of the removal of a mold release agent or a oxidized film remaining on a surface and the uniformization of surface roughness. Then, an intended part is cut for the purpose of mounting to an axle, the installation of a tire, and design.

In coating an aluminum wheel via a cutting step, it is preferable to conduct zirconium-based chemical conversion treatment in order to improve the adhesion of a coating composition and enhance the anticorossive property of a coated surface. The method of the zirconium-based chemical conversion treatment is not particularly restricted and a conventional method may be applied. More specific examples include the method disclosed in Japanese Kokai Publication 2008-80286.

The method for coating an aluminum wheel of the present invention is a method for coating an aluminum wheel in which an anticorrosive coating composition is applied to an aluminum wheel having been subjected to the above-mentioned molding and then a clear coating composition is applied to form a transparent multilayer coating film.

The above-mentioned anticorrosive coating composition contains an acrylic resin (1) and an epoxy resin (2). The acrylic resin (1) and the epoxy resin (2) are materials described in detail below.

The acrylic resin (1) is an acrylic resin having a weight average molecular weight (henceforth abbreviated as Mw) of 50,000 to 140,000, a glass transition point (henceforth abbreviated as Tg) of 20 to 50° C., a hydroxyl value of 10 to 50 mgKOH/g, and an acid value of 10 to 40 mgKOH/g.

As to the acrylic resin (1), the Mw is 50,000 to 140,000, preferably 50,000 to 100,000. That the Mw is within the range of 50,000 to 140,000 affords good adhesion and anticorossive property. The Mw is a value obtained by conversion with polystyrene standards by using GPC (gel permeation chromatography). The Mw referred to in this specification is, in more detail, a value measured under the condition of a flow rate of 0.35 ml/min by using a column for GPC (TSKgel Super HZM-M, 4.6 mmID×15 cm, column temperature 40° C.) and using THF (tetrahydrofuran) as an eluant.

The above-mentioned acrylic resin (1) has a Tg of 20 to 50° C. If lower than 20° C., the anticorrosive property deteriorates, whereas if exceeding 50° C., there arises a problem that the chipping resistance deteriorates. The Tg is preferably 25 to 35° C. The Tg referred to in this specification is a glass transition temperature calculated theoretically by the weighted average of respective monomers based on the glass transition temperatures of homopolymers of the respective monomers.

The above-mentioned acrylic resin (1) has a hydroxyl value of 10 to 50 mgKOH/g. If the hydroxyl value is less than 10 mgKOH/g, the adhesion to a coating film formed from a clear coating composition becomes insufficient and, as a result, desired effects cannot be obtained. If the hydroxyl value exceeds 50 mgKOH/g, a sufficient anticorrosive property cannot be obtained due to deterioration in rust prevention effect. The hydroxyl value is more preferably 10 to 30 mgKOH/g. The hydroxyl value can be determined by a method in accordance with JIS K1557-1.

The above-mentioned acrylic resin (1) has an acid value of 10 to 40 mgKOH/g. That the acid value is less than 10 mgKOH/g is undesirable in that there arises a problem that the adhesion decreases or the corrosion resistance deteriorates due to the shortage of the crosslinking density of a coating film. That the acid value exceeds 40 mgKOH/g is undesirable because there arises a problem that chipping resistance at low temperature deteriorates. The acid value is more preferably 15 to 30 mgKOH/g. The acid value can be determined by a method in accordance with JIS K1557-5.

The above-mentioned acrylic resin (1) is not particularly limited in its chemical structure as long as it satisfies the above-mentioned physical properties, and examples thereof include ones obtained by the polymerization of a composition composed of monomers having a radically polymerizable, ethylenically unsaturated group in the molecule thereof.

Examples of the compound having a radically polymerizable, ethylenically unsaturated group in the molecule thereof include monomers including ethylenic monomers having a hydroxyl group such as hydroxylmethyl(meth)acrylate, hydroxylethyl(meth)acrylate, hydroxylpropyl(meth)acrylate, hydroxylbutyl(meth)acrylate, and N-methylolacrylamine; ethylenic monomers having a carboxyl group such as (meth)acrylic acid, crotonic acid, itaconic acid, boletic acid, and maleic acid; and alkyl esters of (meth)acrylic acid such as methyl(meth)acrylate, ethyl(meth)acrylate, propyl(meth)acrylate, butyl acrylate, n-propyl acrylate, n-butyl acrylate, isobutyl acrylate, 2-ethylhexyl acrylate, n-octyl acrylate, and n-dodecyl acrylate; and compounds polymerizable by a usual method using a monomer composition comprising an ethylenic monomer copolymerizable with the above-mentioned monomers, such as (meth)acrylonitrile and styrene.

The above-mentioned acrylic resin (1) can be obtained by a well known polymerization method, such as emulsion polymerization, solution polymerization, and suspension polymerization, using the above-mentioned compound having an ethylenically unsaturated group as a raw material. An acrylic resin can be adjusted in its molecular weight, acid value, and hydroxyl value through the adjustment of the amounts of components to be used and synthesis conditions in its synthesis. The method of the synthesis of an acrylic resin and the concrete methods of adjusting the molecular weight, acid value, and hydroxyl value of an acrylic resin are well known in the art.

The acrylic resin (1) to be used in the present invention may be a commercially available product. Examples of a commercially available acrylic resin that can be used as the above-mentioned acrylic resin (1) include Dianal HR-2079 and Dianal AS-1545 (product of Mitsubishi Rayon Co., Ltd.).

The above-mentioned epoxy resin (2) is an epoxy resin having an epoxy equivalent of 210 to 1,000 g/eq. The above-mentioned epoxy resin (2) is a general-purpose epoxy resin composed of a compound containing two or more epoxy groups in one molecule thereof. By the incorporation of the above-mentioned epoxy resin (2), the adhesion of a coating film become good and physical properties, such as an anticorossive property, can thereby be improved. If the above-mentioned epoxy equivalent is less than 210 g/eq, the chipping resistance at low temperature deteriorates or the corrosion resistance deteriorates due to the shortage of the crosslinking density of a coating film, whereas if it exceeds 1,000 g/eq, the water resistance deteriorates. The above-mentioned epoxy equivalent is preferably 270 to 1,000 g/eq.

Specific examples of the above-mentioned epoxy resin (2) include glycidyl ether epoxy resins of polyphenol compounds such as bisphenol A, bisphenol F, and 1,1,2,2-tetrakis(4'-hydroxyphenyl)ethane; glycidyl ether epoxy resins of polyhydric phenols such as catechol, resorcinol, hydroquinone, and phloroglucine; glycidyl ether epoxy resins of polyhydric alcohols such as ethylene glycol, butanediol, glycerol, erythritol, and polyoxy alkylene glycol; novolac-type epoxy resins; alicyclic epoxy resins such as vinylcyclohexene dioxide, limonene dioxide, and dicyclopentadiene dioxide; polyglycidyl ester epoxy resins of ester condensates from polycarboxylic acids such as phthalic acid and cyclohexane-1,2-dicarboxylic acid; and polyglycidyl amine epoxy resins. Especially, a glycidyl ether epoxy resin or alicyclic epoxy resin having an epoxy equivalent of 210 to 1,000 g/eq is preferred.

The epoxy resin (2) to be used in the present invention may be a commercially available product. Examples of a commercially available epoxy resin that can be used as the above-mentioned epoxy resin (2) include EP-0150 (product of NSCC Epoxy Manufacturing Co., Ltd.).

The incorporating ratio (parts by weight) of the solid matters of the above-mentioned acrylic resin (1) and the epoxy resin (2), (1)/(2), is 100/5 to 100/20, preferably 100/5 to 100/15. If the incorporating ratio of component (1) is lower than 100/5, wet adhesion deteriorates, and if the incorporating ratio exceeds 100/20, the chipping resistance at low temperatures deteriorates.

The anticorrosive coating composition to be used for the present invention may contain the above-mentioned acrylic resin (1), the epoxy resin (2), and further powdery silica (3) having a number average diameter of primary particles of 7 to 9 nm and a specific surface area (BET method) of 200 to 380 $m^2/g$, and crosslinked polymer particles (4) having a number average diameter of primary particles of 50 to 80 nm. The inclusion of these components is preferable in that a superior anticorrosive property can be obtained since the flowability of a resin at the time of thermal cure after its application is controlled and a good edge covering property is obtained.

The powdery silica (3) to be used for the present invention is preferably powdery silica having a number average diameter of primary particles of 7 to 9 nm and a specific surface area determined by a BET method (a constant pressure capacity method with nitrogen gas using gas adsorption) of 200 to 380 $m^2/g$. The number average diameter of primary particles is an average of the diameters of 3,000 to 5,000 particles obtained by electron microscope observation. The adjustment of the number average diameter of primary particles to within the above-mentioned range is preferable in that an effect to obtain good appearance (skin feeling) can be obtained. The specific surface area is a value determined by a measuring method called a BET method (a constant pressure, constant capacity method with nitrogen gas using gas adsorption). By the adjustment of the specific surface area to within the above-mentioned range, the flowability of a resin at the time of thermal cure after its application can be controlled and a good edge covering property can be obtained.

Commercially available products can be used as the powdery silica that satisfies the above-mentioned numerical value range, and examples thereof include Aerosil 300 (product of Nippon Aerosil Co., Ltd.) and KONASIL K-300 (product of an OCI Company Ltd.).

The amount (parts by weight) of the powdery silica (3) to be incorporated is preferably 5 to 20, more preferably 5 to 10 where the total weight of the solid matters of the acrylic resin (1) and the epoxy resin (2) is taken as 100. The adjustment to within the above-mentioned range is preferable in that an effect to attain good appearance and impartation of an edge covering property simultaneously can be obtained.

As to the crosslinked polymer particles (4) having a number average diameter of primary particles of 50 to 80 nm to be used for the present invention, any resin particles to be used in coating compositions can be used as long as the above-mentioned particle diameter is satisfied. The above-mentioned number average diameter is a value determined by a particle size, particle size distribution measuring method (ELS-800, product of Otsuka Electronics Co., Ltd.) using a dynamic light scattering method.

Specific examples of materials that can be used as the above-mentioned crosslinked polymer particles (4) include acrylic resin particles obtained by emulsion polymerization or solution polymerization using a monomer having two or more radically polymerizable, ethylenically unsaturated groups in one molecule in an amount of 0.1% by weight or more in the overall incorporation. Specific examples include crosslinked polymer particles obtained by the method for producing crosslinked polymer fine particles (microgel) disclosed in Japanese Kokai Publication Sho62-79873, and so on.

The amount (parts by weight) of the crosslinked polymer particles (4) to be incorporated is preferably 1 to 10, more preferably 1 to 5 where the total weight of the solid matters of the acrylic resin (1) and the epoxy resin (2) is taken as 100. The adjustment to within the above-mentioned range is preferable in that there can be obtained an effect that the flowability of a resin at the time of thermal cure after its application becomes proper and the edge covering property is superior.

The above-mentioned anticorrosive coating composition can include components other than the above-mentioned components (1) to (4) as long as no effects are given to the performance as a coating composition. Examples of the components that can be incorporated include silane coupling agents, waxes such as polyethylene wax, plasticizers, leveling agents, dispersants, thickening agents, and surface modifiers.

Above all, the incorporation of a silane coupling agent is preferred. The incorporation of a silane coupling agent is preferable in that the adhesion between an anticorrosive coating composition and a substrate increases and the anticorrosive performance is improved.

The above-mentioned silane coupling agent is a compound having both an organic functional group that exhibits reactivity and/or affinity to organic polymers (curable resins, etc.) and an inorganic functional group that exhibits reactivity and/or affinity to inorganic materials (a pigment contained in an anticorrosive coating composition, etc.). By the use of such a silane coupling agent, it becomes possible to improve the adhesion of an interface where an organic polymer and an inorganic material come into contact with each other and the anticorrosive property and the electric anticorrosive property of a coating film can be enhanced. Examples of the organic functional group that exhibits reactivity and/or affinity to organic polymers include a vinyl group, an epoxy group, a methacryl group, an amino group, and a mercapto group. Examples of the inorganic functional group that exhibits reactivity and/or affinity to inorganic materials include hydrolyzable alkoxy groups such as a methoxy group, an ethoxy group, and a propoxy group.

Examples of a silane coupling agent preferably used for the present invention include
γ-glycidoxyalkyltrialkoxysilanes such as
γ-glycidoxypropyltrimethoxysilane,
γ-glycidoxytriethoxysilane, and
γ-glycidoxypropoxytrimethoxysilane;
γ-aminoalkyltrialkoxysilanes such as
γ-aminopropyltriethoxysilane and
γ-aminopropyltripropoxysilane; and
N-phenyl-γ-aminoalkyltrialkoxysilanes such as
N-phenyl-γ-aminopropyltrimethoxysilane,
N-phenyl-γ-aminopropyltriethoxysilane, and
N-phenyl-γ-aminopropyltripropoxysilane. Out of these,
γ-glycidoxypropyltrimethoxysilane is particularly preferable from the viewpoint of being superior in reactivity to organic polymers.

The silane coupling agent is used preferably in a proportion of 0.5 to 10 parts by weight, more preferably 1 to 5 parts by weight per 100 parts by weight of the resin solid matter in the coating composition. The use of a silane coupling agent in such a proportion can improve the adhesion between a resulting anticorrosive coating film and a substrate and the blistering resistance of an anticorrosive coating film, so that an anticorrosive coating composition more superior in an anticorrosive performance can be obtained.

Although the above-mentioned anticorrosive coating composition may be a coating composition in any form such as a water-based form and a solvent-based form, it is preferred to be a solvent-based coating composition. The application of the anticorrosive coating composition may be performed by a usual method. In the method for coating an aluminum wheel of the present invention, it is preferred to perform baking after the application of the above-mentioned anticorrosive coating composition. It is preferable to perform the baking under conditions including a baking temperature of room temperature to 160° C. and a baking time of 1 to 30 minutes. The thickness of the anticorrosive coating composition after baking at its cut face is preferably 10 to 30 μm. The above-mentioned anticorrosive coating composition is preferably a clear coating composition with transparency.

The method for coating an aluminum wheel of the present invention has a step of applying a clear coating composition after the application of the above-mentioned anticorrosive coating composition. It is preferred to use a coating composition including predetermined amounts of an acrylic resin (5), a melamine resin (6), an ultraviolet absorber (7), and a light stabilizer (8) as the above-mentioned clear coating composition. By the use of such a clear coating composition, the adhesion to an anticorrosive coating film is improved and there can be obtained a preferable effect in that there can be realized an anticorrosive property and adhesion much enough for preventing corrosion even in an area susceptible to salt damage by means of a multilayer coating film composed of a chemical conversion treated film, an anticorrosive coating film, and a clear coating film.

The above-mentioned acrylic resin (5) is preferably an acrylic resin having an Mw of 7,000 to 20,000, a Tg of 0 to 40° C., and a hydroxyl value of 50 to 100 mgKOH/g.

The adjustment of weight average molecular weight of the above-mentioned acrylic resin (5) to 7,000 to 20,000 can afford a preferable effect in the smoothness of a coating film surface to be obtained and the adhesion to an anticorrosive coating film. As to the above-mentioned acrylic resin (5), a preferable effect with respect to chipping resistance is obtained by adjusting its Tg to 0 to 40° C. As to the above-mentioned acrylic resin (5), a preferable effect with respect to adhesion to an anticorrosive coating film is obtained by adjusting its hydroxyl value to 50 to 100 mgKOH/g. Such an acrylic resin (5) can be obtained using the same raw materials as the above-mentioned acrylic resin (1) by the same polymerization method as the above-mentioned acrylic resin (1).

The above-mentioned acrylic resin (5) is preferably contained in an amount of 60 to 80% by weight to the total weight of the coating composition resin solid matter. If the content is less than the lower limit, there is a possibility that chipping resistance becomes insufficient, whereas if it exceeds the upper limit, there is a possibility that the weatherability becomes insufficient.

The above-mentioned melamine resin (6) is not particularly restricted, and a methylated melamine resin, butylated melamine resin, methyl/butyl mixed type melamine resin, etc. can be used. Examples of commercially available products include "Cymel 303" and "Cymel 254" available from Nihon Cytec Industries Inc., "Yuban 128" and "Yuban 20N60" available from Mitsui Chemicals, Inc., and "Sumimal Series" available from Sumitomo Chemical Co., Ltd.

The above-mentioned melamine resin (6) is preferably contained in an amount of 10 to 30% by weight to the total weight of the coating composition resin solid matter. If the content is lower than the lower limit, there is a possibility that the curability becomes insufficient, whereas if it exceeds the upper limit, there is a possibility that a cured coating film becomes excessively rigid and brittle. The content of the melamine resin (6) is more preferably 15 to 25% by weight.

The above-mentioned ultraviolet absorber (7) is not particularly restricted but includes, for example, the following compounds, salicylate ultraviolet absorbers such as phenyl salicylate, 4-tert-butylphenyl salicylate, 2,4-di-tert-butylphenyl-3,5'-di-tert-butyl-4'-hydroxylbenzoate, and 4-tert-octylphenyl salicylate; benzophenone ultraviolet absorbers such as 2,4-dihydroxybenzophenone,
2-hydroxy-4-methoxybenzophenone,
2-hydroxy-4-methoxybenzophenone-5-sulfonic acid,
2-hydroxy-4-n-octoxybenzophenone,
2-hydroxy-4-n-dodecyloxybenzophenone,
2-hydroxy-4-benzyloxybenzophenone,
bis(5-benzoyl-4-hydroxy-2-methoxyphenyl)methane,
2,2-dihydroxy-4-methoxybenzophenone,
2,2'-dihydroxy-4,4'-dimethoxybenzophenone,
2,2',4,4'-tetrahydroxybenzophenone,
4-dodecyloxy-2-hydroxybenzophenone,
2-hydroxy-4-methoxy-2'-carboxybenzophenone, and 2-hydroxy-4-(2-methacryloyloxyethoxy)benzophenone; and benzotriazole ultraviolet absorbers such as
2-(2'-hydroxy-5'-methylphenyl)benzotriazole,
2-[2'-hydroxy-3',5'-bis(α,α-dimethylbenzyl)phenyl]benzotriazole,
2-(2'-hydroxy-3',5'-di-tert-butylphenyl)benzotriazole,
2-(2'-hydroxy-3'-tert-butyl-5'-methylphenyl)-5-chlorobenzotriazole,
2-(2'-hydroxy-3',5'-di-tert-butylphenyl)-5-chlorobenzotriazole, 2-(2'-hydroxy-3',5'-di-tert-amyl)benzotriazole,
2-(2'-hydroxy-5'-tert-octylphenyl)benzotriazole, 2,2'-methylenebis[4-(1,1,3,3-tetrametylbutyl)-6-(2N-benzotriazol-2-yl)phenol]. These may be used either singly or in a combination of two or more species. The content of the above-mentioned ultraviolet absorber is preferably 1 to 5 parts by weight in solid matter content per 100 parts by weight of the total solid matter of the above-mentioned acrylic resin (5) and the above-mentioned melamine resin (6). If the content is less than 1 part by weight, there is a possibility that cracks appear during a weatherability test, whereas if the content exceeds 5 parts by weight, there is a possibility that the curability deteriorates.

The above-mentioned light stabilizer (8) is not particularly restricted but includes, for example, hindered amine light stabilizers such as phenyl-4-piperidinyl carbonate,
bis-(2,2,6,6-tetramethyl-4-piperidinyl) sebacate,
bis-(N-methyl-2,2,6,6-tetramethyl-4-piperidinyl) sebacate,
bis-(1,2,2,6,6-pentamethyl-4-piperidyl)-2-(3,5-di-tert-butyl-4-hydroxybenzyl)-2-n-butyl malonate,
bis-(1,2,2,6,6-pentamethyl-4-piperidyl) sebacate,
1,2,2,6,6-pentamethyl-4-piperidyl methacrylate, and
2,2,6,6-tetramethyl-4-piperidyl methacrylate; and cyanoacrylate light stabilizers such as
ethyl-2-cyano-3,3-diphenyl acrylate,
2-ethylhexyl-2-cyano-3,3'-diphenyl acrylate, and butyl-2-cyano-3-methyl-3-(p-methoxyphenyl) acrylate. Above all, hindered amine light stabilizers, which exhibit greater effects at small amounts, are preferred. The content of the above-mentioned light stabilizer is preferably 1 to 5 parts by weight in solid matter content per 100 parts by weight of the total solid matter of the above-mentioned acrylic resin (5) and the above-mentioned melamine resin (6). If the content is less than 1 part by weight, there is a possibility that cracks appear during a weatherability test, whereas if the content exceeds 5 parts by weight, there is a possibility that the curability deteriorates.

A coating composition including the above-mentioned acrylic resin (5), the melamine resin (6), the ultraviolet absorber (7), and the light stabilizer (8) in predetermined amounts can be produced by a conventional method, and it may be either a water-borne coating composition or a solvent-based coating composition.

The above-mentioned clear coating composition may include components other than the above-mentioned components (5) to (8) as long as no effects are given to the performance as a coating composition. Examples of the components that may be incorporated include silane coupling agents, waxes such as polyethylene wax, plasticizers, leveling agents, dispersants, and thickening agents.

Although the above-mentioned clear coating composition may be a coating composition in any form such as a water-based form and a solvent-based form, it is preferably a solvent-based coating composition. The application of the clear coating composition may be performed by a usual method. The method for coating an aluminum wheel of the present invention includes a case that the above-mentioned anticorrosive coating composition is baked after its application and then a clear coating composition is applied and a case that the anticorrosive coating composition is applied and then a clear coating composition is applied without baking of the anticorrosive coating composition, and both the cases are adoptable. In another possible embodiment, the anticorrosive coating composition is applied several times in layer and then a clear coating composition is applied. It is preferable to perform the baking under conditions including a baking temperature of 80 to 160° C. and a baking time of 5 to 30 minutes. The thickness of the clear coating composition after baking at its cut face is preferably 25 to 60 μm.

The aluminum wheel coated by the above-mentioned method for coating an aluminum wheel is particularly superior in anticorrosive property and therefore can obtain a sufficient anticorrosive property even in the use in an area where problems due to salt damage are prone to occur.

EXAMPLES

The present invention will be described below with reference to Examples, but the invention is not limited to these Examples.

Method for Producing Anticorrosive Coating Composition

A solvent resulting from mixing hydrocarbon solvent/alcohol solvent/ester solvent in the incorporating ratio (parts by weight) given in Table 1 (hereinafter abbreviated as a mixed solvent) was prepared, then an acrylic resin, powdery silica and the mixed solvent were mixed in the ratio given in Table 1, and the powdery silica was dispersed with a batch type disperser using glass beads into a size of 5 μm or less measured with a grindometer (JIS K5600-2-5). The dispersed matter was transferred into another container, then an epoxy resin varnish based on Table 1 was added thereto under agitation, subsequently a crosslinked polymer particle solution and additives were added in a similar manner, and thereby respective anticorrosive coating compositions were produced.

TABLE 1

|  | Comparative Example 1 | Comparative Example 2 | Comparative Example 3 | Comparative Example 4 | Example 1 | Example 2 | Example 3 |
|---|---|---|---|---|---|---|---|
| Acrylic resin A | 15.29 | — | — | — | — | — | — |
| Acrylic resin B | — | 15.29 | — | — | — | — | — |
| Acrylic resin C | — | — | 15.29 | — | — | — | — |
| Acrylic resin D | — | — | — | 15.29 | — | — | — |
| Acrylic resin E | — | — | — | — | 15.29 | — | — |
| Acrylic resin F | — | — | — | — | — | 15.19 | 15.29 |
| Acrylic resin G | — | — | — | — | — | — | — |
| Acrylic resin H | — | — | — | — | — | — | — |
| Acrylic resin I | — | — | — | — | — | — | — |
| Acrylic resin J | — | — | — | — | — | — | — |
| Acrylic resin K | — | — | — | — | — | — | — |

TABLE 1-continued

|  |  | | | | | | | |
|---|---|---|---|---|---|---|---|---|
| Acrylic resin L |  | — | — | — | — | — | — | — |
| Physical property of acrylic resin | Mw | 55,000 | 112,000 | 52,000 | 125,000 | 59,000 | 62,000 | 62,000 |
|  | Tg (° C.) | 30 | 30 | 60 | 10 | 40 | 30 | 30 |
|  | Acid value | 22 | 22 | 22 | 22 | 22 | 22 | 22 |
|  | Hydroxyl value | 5 | 60 | 20 | 20 | 20 | 20 | 20 |
| Epoxy resin |  | 0.81 | 0.81 | 0.81 | 0.81 | 0.81 | 0.81 | 0.81 |
| Powdery silica |  | 2.0 | 2.0 | 2.0 | 2.0 | 2.0 | 1.8 | 2.0 |
| Crosslinkable polymer particles |  | — | — | — | — | — | 0.3 | — |
| Adhesion promoter |  | 1.2 | 1.2 | 1.2 | 1.2 | 1.2 | 1.2 | 1.2 |
| Surface modifier |  | 0.1 | 0.1 | 0.1 | 0.1 | 0.1 | 0.1 | 0.1 |
| Solvent |  | 80.6 | 80.6 | 80.6 | 80.6 | 80.6 | 80.6 | 80.6 |

|  |  | Example 4 | Example 5 | Example 6 | Example 7 | Example 8 | Example 9 | Example 10 |
|---|---|---|---|---|---|---|---|---|
| Acrylic resin A |  | — | — | — | — | — | — | — |
| Acrylic resin B |  | — | — | — | — | — | — | — |
| Acrylic resin C |  | — | — | — | — | — | — | — |
| Acrylic resin D |  | — | — | — | — | — | — | — |
| Acrylic resin E |  | — | — | — | — | — | — | — |
| Acrylic resin F |  | 15.39 | — | — | — | — | — | — |
| Acrylic resin G |  | — | 15.29 | — | — | — | — | — |
| Acrylic resin H |  | — | — | 15.29 | — | — | — | — |
| Acrylic resin I |  | — | — | — | 15.29 | — | — | — |
| Acrylic resin J |  | — | — | — | — | 15.29 | — | — |
| Acrylic resin K |  | — | — | — | — | — | 15.29 | — |
| Acrylic resin L |  | — | — | — | — | — | — | 15.29 |
| Physical property of acrylic resin | Mw | 62,000 | 95,000 | 115,000 | 68,000 | 74,000 | 102,000 | 96,000 |
|  | Tg (° C.) | 30 | 30 | 20 | 50 | 35 | 35 | 35 |
|  | Acid value | 22 | 22 | 22 | 22 | 22 | 22 | 22 |
|  | Hydroxyl value | 20 | 40 | 16 | 30 | 10 | 50 | 40 |
| Epoxy resin |  | 0.81 | 0.81 | 0.81 | 0.81 | 0.81 | 0.81 | 0.81 |
| Powdery silica |  | 1.5 | 2.0 | 2.0 | 2.0 | 2.0 | 2.0 | 2.0 |
| Crosslinkable polymer particles |  | 0.3 | — | — | — | — | — | — |
| Adhesion promoter |  | 1.2 | 1.2 | 1.2 | 1.2 | 1.2 | 1.2 | 1.2 |
| Surface modifier |  | 0.1 | 0.1 | 0.1 | 0.1 | 0.1 | 0.1 | 0.1 |
| Solvent |  | 80.7 | 80.6 | 80.6 | 80.6 | 80.6 | 80.6 | 80.6 |

The numerical values in the table each represent parts by weight.

As to the acrylic resins given in the table, commercially available products or synthesized products were used as acrylic resins each having the physical properties given in Table 1. The components other than the acrylic resins in the table are as follows.

Epoxy resin: EXS-1003 (product of Nippon Paint Co., Ltd.), epoxy equivalent 480 g/eq Powdery silica: Aerosil 300 (product of Nippon Aerosil Co., Ltd.), number average particle diameter 7 nm, specific surface area 300 m²/g Crosslinked polymer particle: AZS-1230 (product of Nippon Paint Co., Ltd.), number average diameter of primary particles 69 nm Adhesion promoter: silane coupling agent KBM-403 (3-glycidoxypropyltrimethoxysilane; product of Shin-Etsu Chemical Co., Ltd.)

Surface modifier: Resimix (product of Mitsui Chemicals, Inc.)

Method for Producing Clear Coating Composition

Acrylic resin M and acrylic resin N were mixed so that the solid matter weight ratio might become 1:2, and further a melamine resin was mixed so that the solid matter weight ratio of the total of acrylic resin M and acrylic resin N to the melamine resin might become 70:30. Moreover, 2 parts of crosslinked polymer particles, 4 parts of an ultraviolet absorber, and 2 parts of a light stabilizer were added per 100 parts of the total solid matter weight of acrylic resin M, acrylic resin N, and the melamine resin and mixed to become homogeneous, and thereby a clear coating composition was produced.

The raw materials used in the above-mentioned method for producing the clear coating composition are as follows.

Acrylic resin M: Dianal HR554 (product of Mitsubishi Rayon Co., Ltd.), Mw 4000, Tg 10° C., hydroxyl value 95 mgKOH/g, acid value 22 mgKOH/g Acrylic resin N: ACR-461 (product of Nippon Paint Co., Ltd.), Mw 8300, Tg 25° C., hydroxyl value 70 mgKOH/g, acid value 20 mgKOH/g Melamine resin: MFS 1000 (product of Nippon Paint Co., Ltd.), Mw 1500

Crosslinked polymer particle: AZS-797 (product of Nippon Paint Co., Ltd.), number average diameter of primary particles 94 nm Ultraviolet absorber: CHISORB 234 (product of Double Bond Chemical Ind., Co., Ltd.)

Light stabilizer: CHISORB 292 (product of Double Bond Chemical Ind., Co., Ltd.)

Method for Pretreating Specimen

After conducting degreasing, water wash, pickling treatment, and water wash to an aluminum wheel, chemical conversion treatment was conducted under the conditions provided below, and then the coating with an anticorrosive coating composition was conducted after water wash and drying. Each of the steps was performed in a dipping system, and the drying was conducted in an electric dryer at 120° C. for 15 minutes. The chemical conversion treatment liquid used had the following composition.

Chemical conversion treatment liquid: chemical conversion treatment liquid (pH 3.2) having the composition of 0.025 g/l of zirconium ion, 0.07 g/l of phosphate ion, 0.04 g/l of aluminum ion, and 0.115 g/l of total fluoride ion ($F^-$), and 0.005 g/l of free fluoride ion (F⁻), treatment temperature: 40° C., immersion treatment time: 45 seconds.

Method for Preparing Specimen

After performing the above-mentioned pretreatment to a cut aluminum wheel, each anticorrosive coating composition was air-sprayed to the whole surface in such a way that the film thickness would become 20 μm on a cut face after thermal cure. A clear coating composition was air-sprayed thereon on the whole surface in such a way that the film thickness would become to 30 μm on a cut face and then was thermally cured by baking (increasing the surface temperature of the aluminum wheel to 140° C. and then holding it for 20 minutes).

CASS Test of Coated Aluminum Wheel

The surface of each specimen for CASS test was cut in a length of 10 cm with a cutter knife, and then a CASS test liquid prepared in accordance with JIS Z2371-2000 was sprayed at 50±2° C. for 240 hours. Thus, the degree of corrosion that occurred within 3 mm around the cut part was evaluated. As to the results, a one side maximum rust width of a coating film of 3 mm or less was rated to be good. The results are shown in Table 2.

The surface of each specimen having been cut into a proper size for a saltwater spraying test was cross-cut with a cutter knife, and then salt water spraying was conducted at 35° C. for 1200 hours using 5% by weight NaCl aqueous solution. After the completion of the salt water spraying, the rust width of one side of the cross-cut part after settling for 24 hours was measured. As to the results, a one side maximum rust width of 2 mm or less was rated to be good. The results are shown in Table 2.

Chipping Resistance Test

Using a gravel testing machine (product of Suga Test Instruments Co., Ltd., JA-400LA), a specimen was set in such a manner that the distance between a pebble throwing testing machine and the specimen would be 350 mm, No. 6 crushed basalt pebbles (product of NIPPO Corporation) were sieved, and 100 g of new pebbles regulated into a size of 4.8 to 8.0 mm were injected onto the specimen at an injection pressure of 0.4 MPa. In evaluation, ten largest damages were chosen in each specimen, and a specimen in which the average of the major axes of the ten damages was less than 2.81 mm was rated as A and a specimen in which the average was 2.81 mm or more was rated as C.

TABLE 2

| | Comparative Example 1 | Comparative Example 2 | Comparative Example 3 | Comparative Example 4 | Example 1 | Example 2 | Example 3 |
|---|---|---|---|---|---|---|---|
| CASS (mm) | 3.4 | 3.2 | 1.9 | 4.5 | 1.6 | 1.3 | 1.3 |
| CASS edge coverying property | B | B | B | B | B | A | B |
| Filiform rust resistance | 2.6 | 3.3 | 2.9 | 2.3 | 1.1 | 0.8 | 0.8 |
| Combined test of CASS and filiform rust resistance (mm) | 11.7 | 12.5 | 7.6 | 13.2 | 7.5 | 5.2 | 5.4 |
| Chipping resistance | A | A | C | A | A | A | A |

| | Example 4 | Example 5 | Example 6 | Example 7 | Example 8 | Example 9 | Example 10 |
|---|---|---|---|---|---|---|---|
| CASS (mm) | 1.4 | 1.9 | 2.5 | 2.1 | 2.7 | 2.4 | 2.0 |
| CASS edge coverying property | A | B | B | B | B | B | B |
| Filiform rust resistance | 0.8 | 1.6 | 1.0 | 1.1 | 1.0 | 1.9 | 1.5 |
| Combined test of CASS and filiform rust resistance (mm) | 5.2 | 8.4 | 7.8 | 7.7 | 6.3 | 9.3 | 8.6 |
| Chipping resistance | A | A | A | A | A | A | A |

CASS Edge Covering Property

The degree of the corrosion of a cut edge part was evaluated in a CASS test. A sample having no rust was rated as A, a sample on which rust was formed at 1 to 3 points was rated as B, and a sample on which rust was formed at 4 or more points was rated as C.

Test of Filiform Rust Resistance of Coated Aluminum Wheel

A cut was made in a coating film and after 8 cycles of "performing salt water spray for 24 hr, subsequently performing humidification (85% RH, 40° C.) for 120 hr, and then spontaneously drying at room temperature for 24 hr", the rust width on one side of the cut part was measured. As to the results, a rust width of a coating film of 2 mm or less was rated to be good. The results are shown in Table 2.

Combined Test of CASS and Filiform Rust Resistance

After performing a test by a method of the above-mentioned CASS test, salt water spraying by the above-mentioned filiform rust resistance test was conducted and then the rust width of one side of the cut part was measured. As to the results, a one side maximum rust width of 10 mm or less was rated to be good. The results are shown in Table 2.

SST Test

INDUSTRIAL APPLICABILITY

The coating method of the present invention is a coating method that imparts particularly superior anticorrosive property and cosmetic property and it can be used suitably as a method for coating an aluminum wheel.

The invention claimed is:

1. A method for coating an aluminum wheel comprising forming a transparent multilayer coating film by applying an anticorrosive coating composition onto the aluminum wheel and then applying a clear coating composition, wherein the anticorrosive coating composition comprises an acrylic resin (1) having a weight average molecular weight of 50,000 to 140,000, a glass transition point of 25 to 50° C., a hydroxyl value of 10 to 30 mgKOH/g, and an acid value of 10 to 40 mgKOH/g, and an epoxy resin (2) having an epoxy equivalent of 210 to 1,000 g/eq and contains the epoxy resin (2) in an amount of 5 to 20 parts by weight on the solid matter basis to 100 parts by weight of the solid matter of the acrylic resin (1).

2. The method for coating an aluminum wheel according to claim 1, wherein the anticorrosive coating composition further comprises, for 100 parts by weight of the solid matter in total of the components (1) and (2), 5 to 20 parts by weight of powdery silica (3) having a number average diameter of primary particles of 7 to 9 nm and a specific surface area (BET method) of 200 to 380 m$^2$/g, and 1 to 10 parts by weight of crosslinked polymer particles (4) having a number average diameter of primary particles of 50 to 80 nm.

3. The method for coating an aluminum wheel according to claim 1, wherein the clear coating composition comprises an acrylic resin (5) and a melamine resin (6), and further comprises, for 100 parts by weight of the solid matter of the components (5) and (6) in total, 1 to 5 parts by weight of an ultraviolet absorber (7) and 1 to 5 parts by weight of a light stabilizer (8).

4. The method for coating an aluminum wheel according to claim 2, wherein the clear coating composition comprises an acrylic resin (5) and a melamine resin (6), and further comprises, for 100 parts by weight of the solid matter of the components (5) and (6) in total, 1 to 5 parts by weight of an ultraviolet absorber (7) and 1 to 5 parts by weight of a light stabilizer (8).

* * * * *